US012674661B2

(12) United States Patent
Zhang

(10) Patent No.: US 12,674,661 B2
(45) Date of Patent: Jul. 7, 2026

(54) METHOD AND APPARATUS FOR CONTROLLING AN ELECTRONIC DEVICE, DEVICE AND READABLE STORAGE MEDIUM

(71) Applicant: GOERTEK INC., Shandong (CN)

(72) Inventor: Chen Zhang, Shandong (CN)

(73) Assignee: GOERTEK INC., Shandong (CN)

( * ) Notice: Subject to any disclaimer, the term of this patent is extended or adjusted under 35 U.S.C. 154(b) by 133 days.

(21) Appl. No.: 18/556,848

(22) PCT Filed: Jun. 24, 2021

(86) PCT No.: PCT/CN2021/101973
§ 371 (c)(1),
(2) Date: Oct. 23, 2023

(87) PCT Pub. No.: WO2022/222262
PCT Pub. Date: Oct. 27, 2022

(65) Prior Publication Data
US 2024/0219172 A1     Jul. 4, 2024

(30) Foreign Application Priority Data

Apr. 23, 2021    (CN) .......................... 202110443073.8

(51) Int. Cl.
*G01B 11/26*        (2006.01)
(52) U.S. Cl.
CPC .................................. *G01B 11/26* (2013.01)
(58) Field of Classification Search
CPC ...................................................... G01B 11/26

(Continued)

(56) References Cited

U.S. PATENT DOCUMENTS 6,094,259 A     7/2000   Kamegwa
6,163,148 A     12/2000  Takada et al.
(Continued)

FOREIGN PATENT DOCUMENTS

CN        2227050 Y      5/1996
CN        1175926 A      3/1998
(Continued)

OTHER PUBLICATIONS

Translation of WO2017198220A1.*

*Primary Examiner* — Sunghee Y Gray
(74) *Attorney, Agent, or Firm* — Ingrassia Fisher & Lorenz, LLP

(57)            ABSTRACT

The present disclosure discloses a method and apparatus for controlling an electronic device, a device and a readable storage medium, and relates to the field of control technology. The electronic device comprises: a base, a rotating body, a first sensor, and a second sensor, wherein the rotating body is rotatably connected to the base, and a physical zero-initialization point is provided on the rotating body or the base; the first sensor is used to detect a rotation angle of the rotating body on a rotation plane; the second sensor is used to detect the physical zero-initialization point, and the physical zero-initialization point is such a position that after the rotation angle of the rotating body detected by the first sensor is zeroed on the rotation plane, the rotation angle of the rotating body on the rotation plane is re-detected by the first sensor.

1 Claim, 5 Drawing Sheets

(58) Field of Classification Search
USPC .......................................................... 356/138
See application file for complete search history.

(56) References Cited

U.S. PATENT DOCUMENTS

| | | | |
|---|---|---|---|
| 2010/0298698 | A1 | 11/2010 | Burbank et al. |
| 2019/0361124 | A1 | 11/2019 | Ogawa et al. |
| 2020/0101971 | A1 | 4/2020 | Fan et al. |

FOREIGN PATENT DOCUMENTS

| | | | | |
|---|---|---|---|---|
| CN | 103354432 | A | 10/2013 | |
| CN | 203730281 | U | 7/2014 | |
| CN | 203864989 | U | 10/2014 | |
| CN | 204421934 | U | 6/2015 | |
| CN | 106052724 | A | 10/2016 | |
| CN | 106286154 | A | 1/2017 | |
| CN | 106447715 | A | 2/2017 | |
| CN | 106514673 | A | 3/2017 | |
| CN | 107526331 | A | 12/2017 | |
| CN | 107831902 | A * | 3/2018 | ............. G06F 3/011 |
| CN | 108873889 | A | 11/2018 | |
| CN | 108961736 | A | 12/2018 | |
| CN | 109033557 | A | 12/2018 | |
| CN | 110879408 | A | 3/2020 | |
| CN | 111447388 | A | 7/2020 | |
| CN | 111901547 | A | 11/2020 | |
| CN | 112135124 | A | 12/2020 | |
| CN | 112478540 | A | 3/2021 | |
| EP | 1300662 | A2 | 4/2003 | |
| WO | 2013130946 | A1 | 1/2016 | |
| WO | WO-2017198220 | A1 * | 11/2017 | ............ G01D 5/245 |

* cited by examiner

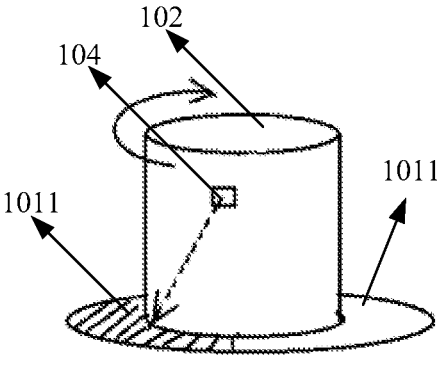

Fig. 2b

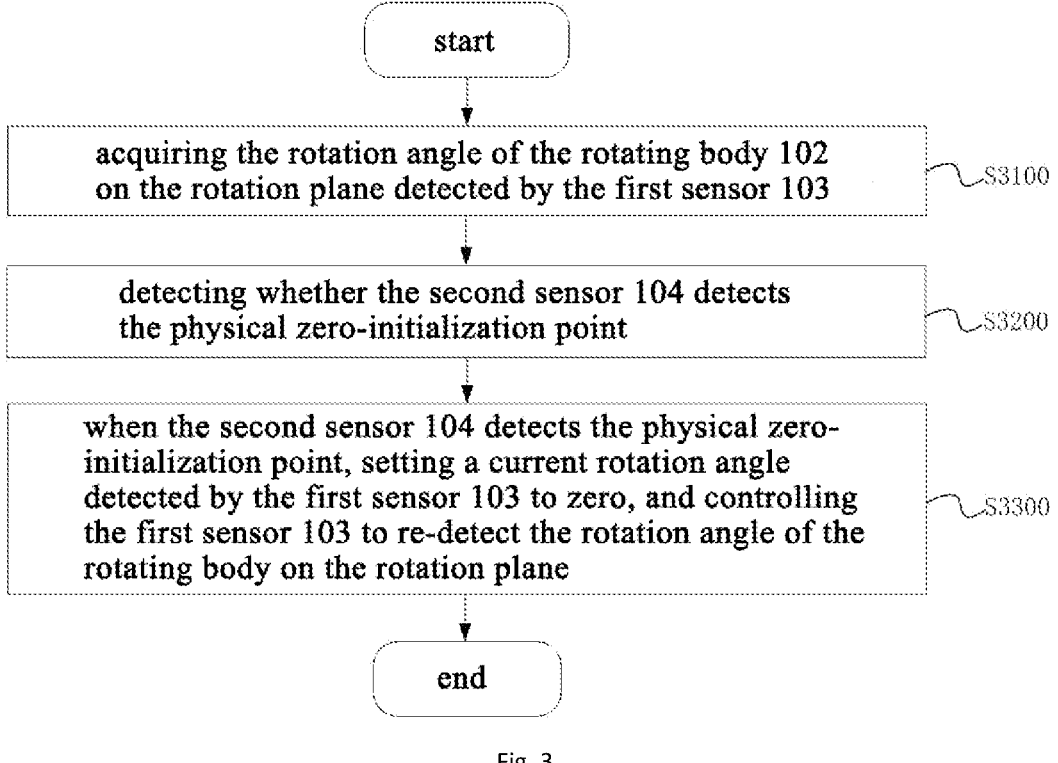

start acquiring the rotation angle of the rotating body 102
on the rotation plane detected by the first sensor 103          S3100 detecting whether the second sensor 104 detects
the physical zero-initialization point          S3200 when the second sensor 104 detects the physical zero-
initialization point, setting a current rotation angle
detected by the first sensor 103 to zero, and controlling
the first sensor 103 to re-detect the rotation angle of the
rotating body on the rotation plane          S3300 end

Fig. 3 prohibited rotation
angle range acquisition module  61 detection module  62 control module  63 apparatus for controlling  60
an electronic device

METHOD AND APPARATUS FOR CONTROLLING AN ELECTRONIC DEVICE, DEVICE AND READABLE STORAGE MEDIUM

CROSS-REFERENCE TO RELATED APPLICATIONS

This application is a U.S. National-Stage entry under 35 U.S.C. § 371 based on International Application No. PCT/CN2021/101973, filed Jun. 24, 2021 which was published under PCT Article 21(2) and which claims priority to Chinese Application No. 202110443073.8, filed Apr. 23, 2021, which are all hereby incorporated herein in their entirety by reference.

TECHNICAL FIELD

This application pertains to the field of control technology, in particular to a method for controlling an electronic device, an apparatus for controlling an electronic device, an electronic device, and a computer-readable storage medium.

BACKGROUND

At present, as a smart home center device, the smart speaker having a display screen has been more and more widely used.

When the user is not in front of the display screen of the smart speaker, the user will not be able to clearly view the content displayed on the display screen. Therefore, a smart speaker whose display screen can rotate by a target angle within a set angle range is proposed. During the rotation process of the display screen, the gyroscope installed in the smart speaker detects the rotation angle of the display screen.

However, since the gyroscope detects the rotation angle in the form of integration, there is an accumulated error in the angle detected by the gyroscope. As a result, when the display screen of the smart speaker rotates by a target angle, there is a certain deviation between the actually rotated angle and the target angle. In addition, other objects, desirable features and characteristics will become apparent from the subsequent summary and detailed description, and the appended claims, taken in conjunction with the accompanying drawings and this background.

SUMMARY

An object of the present disclosure is to provide a new technical solution for controlling the electronic device.

According to a first aspect of the present disclosure, there is provided an electronic device, which comprises: a base, a rotation body, a first sensor, and a second sensor, wherein
the rotation body is rotatably connected to the base, and a physical zero-initialization point is provided on the rotation body or the base;
the first sensor is used to detect a rotation angle of the rotation body on a rotation plane; and
the second sensor is used to detect the physical zero-initialization point, and the physical zero-initialization point is such a position that after the rotation angle of the rotation body on the rotation plane detected by the first sensor is set to zero, the rotation angle of the rotation body on the rotation plane is re-detected by the first sensor.

Optionally, a first surface of the rotation body includes at least two first regions connected end to end, and the at least two first regions are arranged along a rotating direction of the rotation body, and the physical zero-initialization point is provided on the rotation body or the base;
the second sensor is provided on the base and used to emit wave signals toward the first surface of the rotation body;
wherein the wave signals emitted by the second sensor are irradiated on different first regions of the first surface of the rotation body, and reflected light signals received by the second sensor are different.

Optionally, a first surface of the base includes at least two second regions connected end to end, and the at least two second regions are arranged along a rotation direction of the rotation body, and a boundary line between two adjacent second regions is the physical zero-initialization point;
the second sensor is provided on the rotation body and used to emit wave signals toward the first surface of the base;
wherein the wave signals emitted by the second sensor are irradiated on different second regions of the first surface of the base, and reflected light signals received by the second sensor are different.

According to a second aspect of the present disclosure, there is provided a method for controlling an electronic device, which is applied to the electronic device according to any one of the first aspect, and comprises the steps of:
acquiring the rotation angle of the rotation body on the rotation plane detected by the first sensor;
detecting whether the physical zero-initialization point was detected by the second sensor; and
when the physical zero-initialization point was detected by the second sensor, setting a current rotation angle detected by the first sensor to zero, and controlling the first sensor to re-detect the rotation angle of the rotation body on the rotation plane.

According to a third aspect of the present disclosure, there is provided another method for controlling an electronic device, which is applied to the electronic device according to any one of the first aspect, and comprises the steps of:
acquiring a target rotation direction and a first target rotation angle;
controlling the rotation body to rotate by the first target rotation angle along the target rotation direction;
when the rotation body rotates by the first target rotation angle along the target rotation direction, if the physical zero-initialization point was detected by the second sensor, determining a second target rotation angle according to the current rotation angle detected by the first sensor and the first target rotation angle;
setting the current rotation angle detected by the first sensor to zero, and controlling the first sensor to re-detect the rotation angle of the rotation body on the rotation plane; and
updating the second target rotation angle to the first target rotation angle, and repeating the step of controlling the rotation body to rotate by the first target rotation angle along the target rotation direction.

Optionally, after the step of acquiring the target rotation direction and the first target rotation angle, the method further comprises the steps of:
acquiring a third target rotation angle, wherein the third target rotation angle is a rotation angle needed for rotating, for the first time, to a boundary of a prohibited rotation angle range along the target rotation direction;

judging whether the first target rotation angle is greater than the third target rotation angle;

when the first target rotation angle is less than or equal to the third target rotation angle, triggering the step of controlling the rotation body to rotate by the first target rotation angle along the target rotation direction; and when the first target rotation angle is greater than the third target rotation angle, updating the target rotation direction to a rotation direction opposite to the target rotation direction, and updating the first target rotation angle to a difference value between 360° and the first target rotation angle, and triggering the step of controlling the rotation body to rotate by the first target rotation angle along the target rotation direction.

According to a fourth aspect of the present disclosure, there is provided an apparatus for controlling an electronic device, the electronic device is the electronic device according to any one of the first aspect, and the apparatus comprises:

an acquisition module configured to acquire the rotation angle of the rotation body on the rotation plane detected by the first sensor;

a detection module configured to detect whether the physical zero-initialization point was detected by the second sensor; and a control module configured to, when the physical zero-initialization point was detected by the second sensor, set a current rotation angle detected by the first sensor to zero, and control the first sensor to re-detect the rotation angle of the rotation body on the rotation plane.

According to a fifth aspect of the present disclosure, another apparatus for controlling an electronic device is provided, the electronic device is the electronic device according to any one of the first aspect, and the apparatus comprises:

an acquisition module configured to acquire a target rotation direction and a first target rotation angle;

a first control module configured to control the rotation body to rotate by the first target rotation angle along the target rotation direction;

a determination module configured to, when the rotation body rotates by the first target rotation angle along the target rotation direction, if the physical zero-initialization point was detected by the second sensor, determine a second target rotation angle according to the current rotation angle detected by the first sensor and the first target rotation angle;

a second control module configured to set the current rotation angle detected by the first sensor to zero, and control the first sensor to re-detect the rotation angle of the rotation body on the rotation plane; and a third control module configured to update the second target rotation angle to the first target rotation angle, and repeat controlling the rotation body to rotate by the first target rotation angle along the target rotation direction.

According to the sixth aspect of the present disclosure, another electronic device is provided, which comprises a base, a rotation body, a first sensor, a second sensor, and the control device for the electronic device as described in the fourth or fifth aspect;

or, the electronic device comprises a memory, a processor, the base, the rotation body, the first sensor, and the second sensor;

wherein the rotation body is rotatably connected to the base, and a physical zero-initialization point is provided on the rotation body or the base;

the first sensor is used to detect a rotation angle of the rotation body on a rotation plane;

the second sensor is used to detect the physical zero-initialization point, and the physical zero-initialization point is such a position that after the rotation angle of the rotation body on the rotation plane detected by the first sensor is set to zero, the rotation angle of the rotation body on the rotation plane is re-detected by the first sensor;

the memory is used to store computer instructions; and the processor is used to call the computer instructions from the memory to execute the method according to any one of the second aspect or the third aspect.

According to a seventh aspect of the present disclosure, there is provided a computer-readable storage medium, on which a computer program is stored, and when the computer program is executed by a processor, the method according to any one of the second aspect or the third aspect is realized.

In an embodiment of the present disclosure, an electronic device is provided, the electronic device comprises: a base, a rotation body, a first sensor, and a second sensor, wherein the rotation body is rotatably connected to the base, and a physical zero-initialization point is provided on the rotation body or the base; the first sensor is used to detect a rotation angle of the rotation body on a rotation plane; and the second sensor is used to detect the physical zero-initialization point, and the physical zero-initialization point is such a position that after the rotation angle of the rotation body on the rotation plane detected by the first sensor is set to zero, the rotation angle of the rotation body on the rotation plane is re-detected by the first sensor. In this way, since the rotation angle of the rotation body detected by the first sensor on the rotation plane is set to zero, it is possible to stop accumulating the accumulated error of the rotation angle detected before setting to zero. Further, according to the maximum rotation angle recorded by the first sensor before setting to zero and the rotation angle obtained by re-detection, the total rotation angle of the rotation body whose error is reduced can be known. In this way, when the electronic device rotates by the target angle, the resultant deviation between the actually rotated angle and the target angle is reduced. That is to say, the electronic device according to the embodiment of the present disclosure provides a hardware basis for reducing the resultant deviation between the actually rotated angle and the target angle when the electronic device is rotated by the target angle.

Other features and advantages of the present disclosure will become clearer by reading the following detailed description of the exemplary embodiments of the present disclosure with reference to the accompanying drawings.

BRIEF DESCRIPTION OF DRAWINGS

The present invention will hereinafter be described in conjunction with the following drawing figures, wherein like numerals denote like elements, and:

FIG. 2b is a third schematic diagram of the structure of an electronic device according to an embodiment of the present disclosure;

FIG. 3 is a schematic flowchart of a method for controlling an electronic device according to an embodiment of the present disclosure;

DETAILED DESCRIPTION

Figure 1:
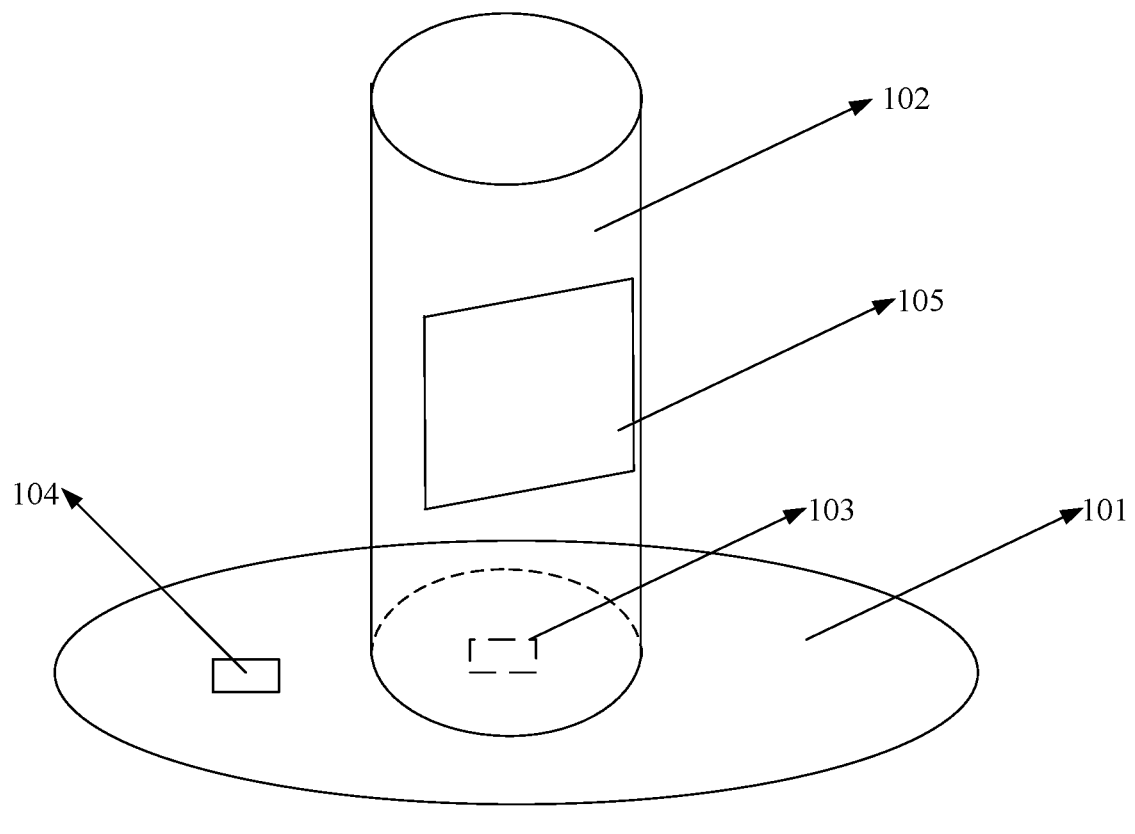
FIG. 1 is a first schematic diagram of the structure of an electronic device according to an embodiment of the present disclosure.

The following detailed description is merely exemplary in nature and is not intended to limit the invention or the application and uses of the invention. Furthermore, there is no intention to be bound by any theory presented in the preceding background of the invention or the following detailed description.

Now, various exemplary embodiments of the present disclosure will be described in detail with reference to the accompanying drawings. It should be noted that, unless specified otherwise, the arrangements of the members and steps, mathematical formulas and numerical values described in these embodiments do not restrict the scope of the present disclosure.

The following description of at least one exemplary embodiment is in fact only illustrative, and in no way serves as any restriction on the present disclosure and its application or use.

The techniques, methods and equipment known to a person of ordinary skill in the art may not be discussed in detail. However, when applicable, these techniques, methods and equipment shall be considered as a part of the specification.

In all the examples shown and discussed herein, any specific value should be interpreted as merely illustrative and not as a limitation. Therefore, other examples of the exemplary embodiments may have different values.

It should be noted that similar reference numerals and letters denote similar items in the following drawings. Therefore, once an item is defined in one drawing, it does not need to be further discussed in the subsequent drawings.

Device Embodiment 1

An embodiment of the present disclosure provides an electronic device. As shown in FIG. 1, the electronic device comprises: a base 101, a rotation body 102, a first sensor 103, and a second sensor 104.

The rotation body 102 is rotatably connected to the base 101, and a physical zero-initialization point is provided on the rotation body 102 or the base 101.

The first sensor 103 is used to detect the rotation angle of the rotation body 102 on the rotation plane.

The second sensor 104 is used to detect the physical zero-initialization point. The physical zero-initialization point is such a position that after the rotation angle of the rotation body 102 on the rotation plane detected by the first sensor 103 is set to zero, the rotation angle of the rotation body on the rotation plane is re-detected by the first sensor 103.

In this embodiment, a specific component may be fixedly connected to the rotation body 102 so that the specific component is driven to rotate.

In an example, as shown in FIG. 1, the specific component may be a display screen 105. On this basis, the electronic device according to this embodiment may be an electronic device with a rotating screen, such as a smart speaker.

In this embodiment, the first sensor 103 is a rotation angle detection sensor having an accumulated error. In an example, the first sensor 103 is a gyroscope.

In this embodiment, the first sensor 103 may be provided on the rotation body 102, so as to detect the rotation angle of the rotation body 102 on the rotation plane.

In this embodiment, the rotation body 102 or the base 101 is provided with a physical zero-initialization point. The physical zero-initialization point is a physical mark that actually exists on the rotation body 102 or the base 101.

It should be noted that the physical zero-initialization point and the second sensor 104 are separately provided on the rotation body 102 and the base 101. That is to say, when the physical zero-initialization point is provided on the rotation body 102, the second sensor 104 is provided on the base 101. When the second sensor 104 is provided on the rotation body 102, the physical zero-initialization point is provided on the base 101.

In this embodiment, when the second sensor 104 detects the physical zero-initialization point, the rotation angle of the rotation body 102 on the rotation plane detected by the first sensor 103 is set to zero, and the first sensor 103 re-detects the rotation angle of the rotation body 102 on the rotation plane.

In this embodiment, after the second sensor 104 detects the physical zero-initialization point provided on the rotation body 102 or the base 101, the rotation angle of the rotation body 102 on the rotation plane detected by the first sensor 103 is set to zero, and then (the position of) the rotation angle of the rotation body 102 on the rotation plane is re-detected by the first sensor 103. In this way, since the rotation angle detected by the first sensor 103 is set to zero, it is possible to stop accumulating the accumulated error of the rotation angle detected before setting to zero. Further, according to the maximum rotation angle recorded by the first sensor 103 before setting to zero and the rotation angle obtained by re-detection, the total rotation angle of the rotation body 102 whose error is reduced can be known.

In addition, since the rotation angle detected by the first sensor 103 is set to zero, it is possible to stop accumulating the accumulated error of the rotation angle detected before setting to zero. Thus, for example, when it is necessary to determine the current position (angle) of the rotation body 102, the error of the current position (angle) can also be reduced.

In this embodiment of the present disclosure, an electronic device is provided, the electronic device comprises a base, a rotation body, a first sensor, and a second sensor, wherein the rotation body is rotatably connected to the base, and a physical zero-initialization point is provided on the rotation body or the base; the first sensor is used to detect a rotation angle of the rotation body on a rotation plane; the second sensor is used to detect the physical zero-initialization point, and the physical zero-initialization point is such a position that after the rotation angle of the rotation body on the rotation plane detected by the first sensor is set to zero, the rotation angle of the rotation body on the rotation plane is re-detected by the first sensor. In this way, since the rotation angle of the rotation body detected by the first sensor is set to zero, it is possible to stop accumulating the accumulated error of the rotation angle detected before setting to zero. Further, according to the maximum rotation angle recorded by the first sensor before setting to zero and the rotation angle obtained by re-detection, the total rotation angle of the rotation body whose error is reduced can be known. In this way, when the electronic device rotates by the target angle, the resultant deviation between the actually rotated angle and the target angle is reduced. That is to say, the electronic device according to this embodiment of the present disclosure provides a hardware basis for reducing the resultant deviation between the actually rotated angle and the target angle when the electronic device is rotated by the target angle.

In this embodiment, the following two types of specific structures of the rotation body 102 and the base 101 in the electronic devices are provided.

First Type of Structure

The first surface of the rotation body 102 includes at least two first regions 1021 connected end to end, and at least two first regions 1021 are arranged along the rotating direction of the rotation body 102, and the boundary line between two adjacent first regions 1021 is the physical zero-initialization point.

The second sensor 104 is provided on the base, and is used to emit wave signals toward the first surface of the rotation body 102.

The wave signals emitted by the second sensor 104 are irradiated on different first regions 1021 of the first surface of the rotation body 102, and reflected light signals received by the second sensor 104 are different.

In this embodiment, the second sensor 104 emits wave signals toward the first surface of the rotation body 102. The wave signal may be a light wave, an acoustic wave, a millimeter wave, or the like.

In an example, the second sensor 104 may be an infrared light distance sensor.

In this embodiment, the first surface of the rotation body 102 is the surface of the rotation body 102 that the wave signals emitted by the second sensor 104 can reach.

In an example, when the second sensor 104 is provided on the base 101, the first surface of the rotation body 102 may be a side surface of the rotation body 102, and may also be a lower surface of the rotation body 102 facing the base 101.

In this embodiment, the first surface of the rotation body 102 includes at least two first regions 1021 connected to end. Moreover, the wave signals emitted by the second sensor 104 are irradiated on different first regions of the first surface of the rotation body 102, and reflected light signals received by the second sensor 104 are different. On this basis, the second sensor 104 can determine that the wave signals emitted by itself are irradiated from one first region 1021 to the adjacent first region 1021 according to the abrupt change of the received reflected light signals, and then the boundary line between the adjacent first regions 1021 is detected, that is, the physical zero-initialization point is detected.

Figure 2A:
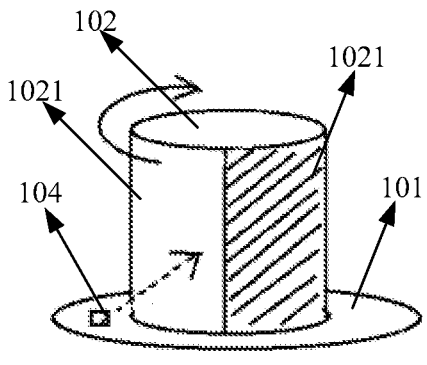
FIG. 2a is a second schematic diagram of the structure of an electronic device according to an embodiment of the present disclosure.

In this embodiment, taking the first surface of the rotation body 102 being the side surface of the rotation body 102 as an example, the structure of the electronic device may be as shown in FIG. 2a.

In an example, taking the second sensor 104 being an infrared light sensor as an example, two adjacent first regions 1021 may be set to have different light absorption rates for the wave signals emitted by the second sensor 104.

For example, two adjacent first regions 1021 are white and black respectively. In this way, the intensities of reflected light signals received by the second sensor 104 are different. At the moment that the intensity of the reflected light signal received by the second sensor 104 abruptly changes, it is determined that the second sensor 104 detects the boundary line between two adjacent first regions 1021, that is, it is determined that the second sensor 104 detects the physical zero-initialization point provided on the rotation body 102.

Second Type of Structure

The first surface of the base 101 includes at least two second regions 1011 connected end to end, and the at least two second regions are arranged along the rotation direction of the rotation body 102.

The second sensor 104 is provided on the rotation body, and is used to emit wave signals toward the first surface of the base 101.

The wave signals emitted by the second sensor 104 are irradiated on different second regions of the first surface of the base 101, and reflected light signals received by the second sensor 104 are different.

When the second sensor 104 detects the boundary line between adjacent second regions 1011, it is determined that the physical zero-initialization point provided on the base 101 is detected.

In this embodiment, the structure of the electronic device may be as shown in FIG. 2b.

It should be noted that the explanation of the second structure according to this embodiment is similar to the first structure above, and its explanation will not be repeated here.

Method Embodiment 1

An embodiment of the present disclosure provides a method for controlling an electronic device, and the method is applied to any electronic device provided in the device embodiment 1 above.

As shown in FIG. 3, the method for controlling an electronic device according to this embodiment of the present disclosure comprises the following steps S3100-S3300:

S3100: acquiring the rotation angle of the rotating body 102 on the rotation plane detected by the first sensor 103;

S3200: detecting whether the second sensor 104 detects the physical zero-initialization point;

In this embodiment, regarding the description of the first sensor 103, the second sensor 104 and the physical zero-initialization point, please refer to the corresponding description in the above device embodiment, and will not be repeated here.

S3300: when the second sensor 104 detects the physical zero-initialization point, setting a current rotation angle detected by the first sensor 103 to zero, and controlling the first sensor 103 to re-detect the rotation angle of the rotating body on the rotation plane.

It can be understood that the current rotation angle in the above S3300 is the maximum rotation angle detected before the first sensor 103 is set to zero.

In this embodiment, when the physical zero-initialization point was detected by the second sensor provided on the rotation body or the base, the current rotation angle detected by the first sensor may be recorded. After the current rotation angle obtained by the first sensor is recorded, the current rotation angle detected by the first sensor is set to zero, and the first sensor is controlled to re-detect the rotation angle of the rotation body on the rotation plane. In this way, since the rotation angle of the rotation body detected by the first sensor is set to zero, it is possible to stop accumulating the accumulated error of the rotation angle detected before setting to zero. Further, according to the sum of the current rotation angle and the rotation angle of the rotation body on the rotation plane re-detected by the first sensor, the total rotation angle of the rotation body whose error is reduced can be known. That is to say, the method for controlling an electronic device according to the embodiments of the present disclosure can reduce the resultant deviation between the actually rotated angle and the target angle when the electronic device is rotated by the target angle.

In combination with the above content, the resultant total rotation angle of the rotation body 102 will be explained by taking that the second sensor 104 detects the physical zero-initialization point once during one rotation of the rotation body 102 as an example. Specifically, when the second sensor 104 detects the physical zero-initialization point, if the current rotation angle detected by the first sensor 103 is 50°, the 50° is recorded, and the current rotation angle detected by the first sensor 103 is set to zero. The rotation body 102 continues to rotate. When the current rotation angle detected by the first sensor 103 is 30°, the rotation body 102 stops rotating. At this moment, the total rotation angle of the rotation body 102 is 80°.

Then, the resultant total rotation angle of the rotation body 102 will be further explained by taking that the second sensor 104 detects the physical zero-initialization point twice during one rotation of the rotation body 102 as an example. Specifically, when the second sensor 104 detects the physical zero-initialization point for the first time, if the current rotation angle detected by the first sensor 103 is 50°, the 50° is recorded, and the current rotation angle detected by the first sensor 103 is set to zero. The rotation body 102 continues to rotate. When the rotation body 102 is detected at 70°, the second sensor 104 detects the physical zero-initialization point again. At this moment, the 70° is recorded, and the current rotation angle detected by the first sensor 103 is set to zero. The rotation body 102 continues to rotate. When the current rotation angle detected by the first sensor 103 is 30°, the rotation body 102 stops rotating. At this moment, the total rotation angle of the rotation body 102 is 150°.

Method Embodiment 2

An embodiment of the present disclosure provides a method for controlling an electronic device, and the method is applied to any electronic device provided in the device embodiment 1 above.

Figure 4:
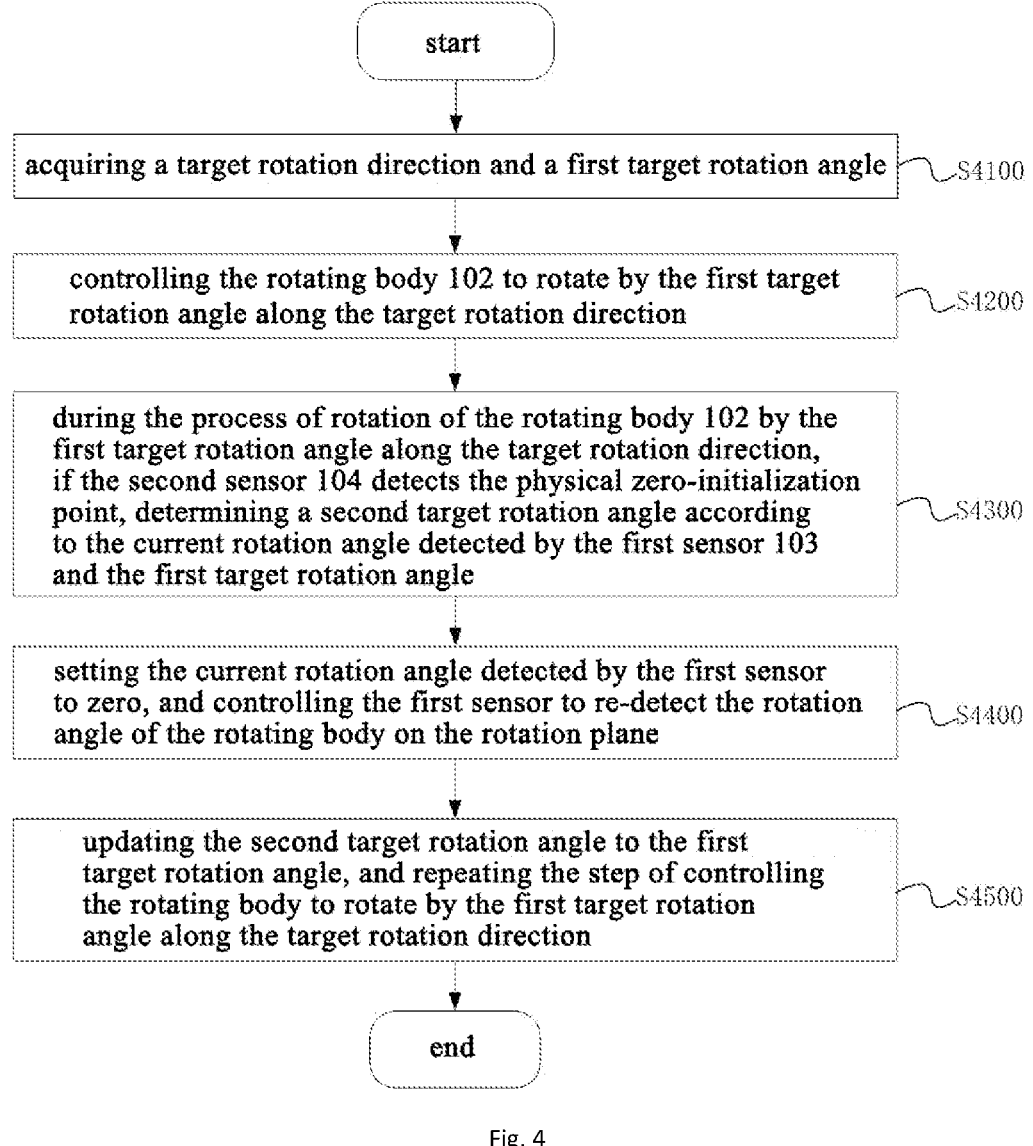
FIG. 4 is a schematic flowchart of another method for controlling an electronic device according to an embodiment of the present disclosure.

As shown in FIG. 4, the method comprises the following steps S4100-S4500:

S4100: acquiring a target rotation direction and a first target rotation angle;

In this embodiment, the target rotation direction and the first target rotation angle may be manually or voice input by the user, or may be automatically detected by the electronic device.

It should be noted that, in this embodiment of the present disclosure, there is no limitation on how to obtain the target rotation direction and the first target rotation angle.

It can be understood that, in this embodiment, the first target rotation angle is usually an angle less than or equal to 180°. This is because the posture of the rotation body 102 when it is rotated by an angle smaller than 180° is the same as the posture of the rotation body 102 when it is rotated by an angle which is the difference between 360° and the angle smaller than 180°.

In an example, when the electronic device is a speaker having a display screen, the first target rotation angle is the included angle of the display screen toward the user's location. The target rotation direction is the direction that the user faces toward with respect to the display screen.

S4200: controlling the rotating body 102 to rotate by the first target rotation angle along the target rotation direction;

S4300: during the process of rotation of the rotating body 102 by the first target rotation angle along the target rotation direction, if the second sensor 104 detects the physical zero-initialization point, determining a second target rotation angle according to the current rotation angle detected by the first sensor 103 and the first target rotation angle;

In this embodiment, the second target rotation angle is an angle that still needs to be rotated after the rotation body 102 rotates to the current rotation angle in S4300 during the process of rotation of the rotating body 102 by the first target rotation angle.

In this embodiment, during the process of rotation of the rotating body 102 by the first target rotation angle along the target direction, if the second sensor 104 detects the physical zero-initialization point provided on the rotation body 102 or the base 101, the current rotation angle detected by the first sensor 103 is recorded. Then, the second target rotation angle is calculated according to the difference between the first target rotation angle and the recorded current rotation angle.

S4400: setting the current rotation angle detected by the first sensor to zero, and controlling the first sensor to re-detect the rotation angle of the rotating body on the rotation plane;

In this embodiment, after the above S4300 is executed, the current rotation angle is set to zero. In this way, it is possible to stop accumulating the accumulated error of the rotation angle detected before setting to zero.

S4500: updating the second target rotation angle to the first target rotation angle, and repeating the step of controlling the rotating body to rotate by the first target rotation angle along the target rotation direction.

In this embodiment, after the above S4500 is executed, it can be realized that during the rotation of the rotation body 102 by the second target rotation angle, the deviation between the actually rotated angle and the second target rotation angle is reduced.

In this embodiment, the target rotation direction and the first target rotation angle are acquired; the rotating body is controlled to rotate by the first target rotation angle along the target rotation direction; during the process of rotation of the rotating body by the first target rotation angle along the target rotation direction, if the physical zero-initialization point was detected by the second sensor, the second target rotation angle is determined according to the current rotation angle detected by the first sensor and the first target rotation angle; the current rotation angle detected by the first sensor is set to zero, and the first sensor is controlled to re-detect the rotation angle of the rotating body on the rotation plane; the second target rotation angle is updated to the first target rotation angle, and the step of controlling the rotating body to rotate by the first target rotation angle along the target rotation direction is repeated. In this way, since the rotation angle of the rotation body detected by the first sensor is set to zero, it is possible to stop accumulating the accumulated error of the rotation angle detected before setting to zero. Further, the more accurate second target rotation angle can be determined according to the current rotation angle and the first target rotation angle. In this way, after the rotation body rotates by the second target rotation angle, the resultant deviation between the actually rotated angle of the rotation body and the target angle is reduced.

Figures 5, 6:
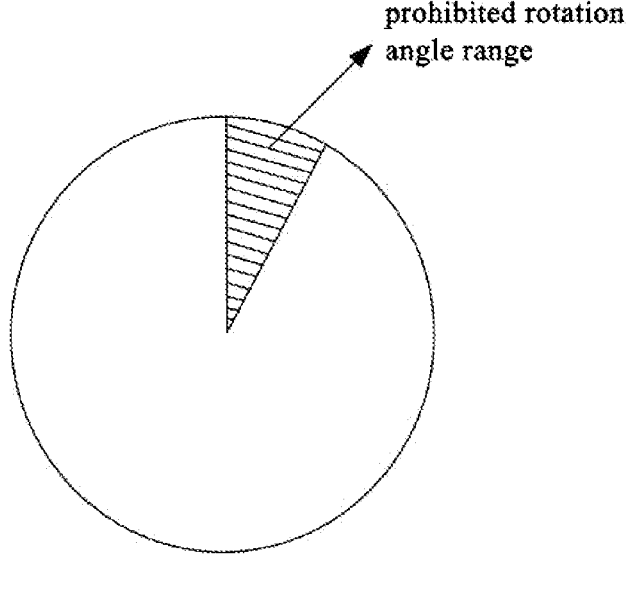
FIG. 5 is a schematic diagram of a prohibited rotation angle range of a rotation body according to an embodiment of the present disclosure.
FIG. 6 is a schematic diagram of the structure of an apparatus for controlling an electronic device according to an embodiment of the present disclosure.

In an embodiment, due to design limitations of the rotation body 102, the rotation body 102 cannot achieve 360° rotation without dead angle, that is, the rotation body 102 usually has a prohibited rotation angle range, as shown in FIG. 5, for example. That is to say, the rotation angle that the rotation body 102 can rotate continuously is less than 360°.

On the basis that the rotation body 102 has a prohibited rotation angle range, the method for controlling an electronic device according to this embodiment of the present disclosure further comprises the following steps S4110-S4140 after the above S4100:

S4110: acquiring a third target rotation angle, wherein the third target rotation angle is a rotation angle needed for rotating, for the first time, to a boundary of a prohibited rotation angle range along the target rotation direction;

S4111: judging whether the first target rotation angle is greater than the third target rotation angle;

S4112: when the first target rotation angle is less than or equal to the third target rotation angle, triggering the step of controlling the rotating body to rotate by the first target rotation angle along the target rotation direction;

In this embodiment, when the first target rotation angle is less than or equal to the third target rotation angle, it indicates that when the rotating body 102 rotates by the first target rotation angle along the target rotation direction, it needs not to pass through the prohibited rotation angle range. At this moment, the rotation body 102 can rotate by the first target rotation angle along the target rotation direction.

S4113: when the first target rotation angle is greater than the third target rotation angle, updating the target rotation direction to a rotation direction opposite to the target rotation direction, and updating the first target rotation angle to a difference value between 360° and the first target rotation angle, and triggering the step of controlling the rotating body 102 to rotate by the first target rotation angle along the target rotation direction.

In this embodiment, when the first target rotation angle is greater than the third target rotation angle, it indicates that when the rotating body 102 rotates by the first target rotation angle along the target rotation direction, it needs to pass through the prohibited rotation angle range. However, the rotation body 102 cannot pass through the prohibited rotation angle range. At this moment, the rotation body 102 needs to rotate in reverse. That is, it needs to be rotated in the opposite direction of the target rotation direction. Specifically, the rotation angle to be rotated is the difference value between 360° and the first target rotation angle. On this basis, the first target rotation angle may be updated as the difference value between 360° and the first target rotation angle. In this way, it is possible to control the rotation body 102 to rotate to a position corresponding to the first target rotation angle.

In this embodiment, through the above steps S4110-S4113, it is possible to control the rotation body 102 to rotate along the shortest rotatable path.

On the basis of the above embodiment, before the above S4100, the method for controlling an electronic device according to this embodiment of the present disclosure may further comprise the following steps S4120 and S4121:

S4120: detecting whether the electronic device is in a rotation mode.

S4121: if yes, triggering the step of acquiring the target rotation direction and the first target rotation angle.

In an embodiment, a corresponding button may be provided on the electronic device. When the button is pressed, it indicates that the electronic device is in the rotation mode. Correspondingly, if the button is not pressed, it indicates that the electronic device is not in the rotation mode. On this basis, users can determine whether to press the button according to their own needs.

In this embodiment, the above step S4100 is triggered only when the electronic device is in the rotation mode, and thus the personalized needs of users can be satisfied.

On the basis of the above embodiment, the method for controlling an electronic device according to this embodiment of the present disclosure may further comprise the steps S4130-S4132 after the above S4100:

S4130: detecting whether the rotation body has a prohibited rotation angle range.

S4131: if not, triggering the step of controlling the rotation body to rotate by the first target rotation angle along the target rotation direction.

S4132: if yes, triggering the step of acquiring the third target rotation angle.

In an embodiment, an input entry may be provided, which is used by developers to input information about whether there is a prohibited rotation angle range of the rotation body. The electronic device can detect whether the rotation body has a prohibited rotation angle range by reading the information input from the input entry.

In this embodiment, by detecting whether the rotation body has a rotation angle range, it can be determined whether to trigger the step of acquiring the third target rotation angle, or to trigger the step of controlling the rotation body to rotate by the first target rotation angle along the target rotation direction. In this way, unnecessary processing by the electronic device can be avoided, thereby reducing the computer processing overhead of the electronic device.

Apparatus Embodiment 1

An embodiment of the present disclosure provides an apparatus 60 for controlling an electronic device, wherein the electronic device is any electronic device provided in the device embodiment 1 above.

As shown in FIG. 6, the apparatus 60 comprises: an acquisition module 61, a detection module 62 and a control module 63.

The acquisition module 61 is for acquiring the rotation angle of the rotating body on the rotation plane detected by the first sensor.

The detection module 62 is for detecting whether the physical zero-initialization point was detected by the second sensor.

The control module 63 is for, when the physical zero-initialization point was detected by the second sensor, setting a current rotation angle detected by the first sensor to zero, and controlling the first sensor to re-detect the rotation angle of the rotating body on the rotation plane.

Apparatus Embodiment 2

An embodiment of the present disclosure provides an apparatus 70 for controlling an electronic device, wherein the electronic device is any electronic device provided in the device embodiment 1 above.

Figure 7:
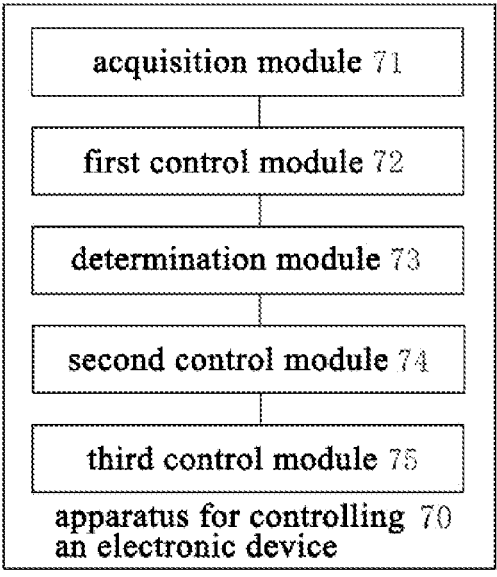
FIG. 7 is a schematic diagram of the structure of another apparatus for controlling an electronic device according to an embodiment of the present disclosure.

As shown in FIG. 7, the apparatus 70 comprises: an acquisition module 71, a first control module 72, a determination module 73, a second control module 74 and a third control module 75.

The acquisition module 71 is for acquiring a target rotation direction and a first target rotation angle.

The first control module 72 is for controlling the rotating body to rotate by the first target rotation angle along the target rotation direction.

The determination module 73 is for, during the process of rotation of the rotating body by the first target rotation angle along the target rotation direction, if the physical zero-initialization point was detected by the second sensor, determining a second target rotation angle according to the current rotation angle detected by the first sensor and the first target rotation angle.

The second control module 74 is for setting the current rotation angle detected by the first sensor to zero, and controlling the first sensor to re-detect the rotation angle of the rotating body on the rotation plane.

The third control module 75 is for updating the second target rotation angle to the first target rotation angle, and repeating the step of controlling the rotating body to rotate by the first target rotation angle along the target rotation direction.

In an embodiment, the acquisition module 71 is further for acquiring a third target rotation angle, wherein the third target rotation angle is a rotation angle needed for rotating, for the first time, to a boundary of a prohibited rotation angle range along the target rotation direction.

In this embodiment, the apparatus 70 for controlling an electronic device according to this embodiment of the present disclosure further comprises a judging module and a triggering module.

The judging module is for judging whether the first target rotation angle is greater than the third target rotation angle.

The triggering module is for, when the first target rotation angle is less than or equal to the third target rotation angle, triggering the step of controlling the rotating body to rotate by the first target rotation angle along the target rotation direction; and, when the first target rotation angle is greater than the third target rotation angle, updating the target rotation direction to a rotation direction opposite to the target rotation direction, and updating the first target rotation angle to a difference value between 360° and the first target rotation angle, and trigger the step of controlling the rotating body to rotate by the first target rotation angle along the target rotation direction.

Device Embodiment 2

An embodiment of the present disclosure provides an electronic device 80. The electronic device 80 comprises a base 101, a rotation body 102, a first sensor 103, a second sensor 104, and any apparatus for controlling an electronic device in the device embodiment 1 or the device embodiment 2.

Figure 8:
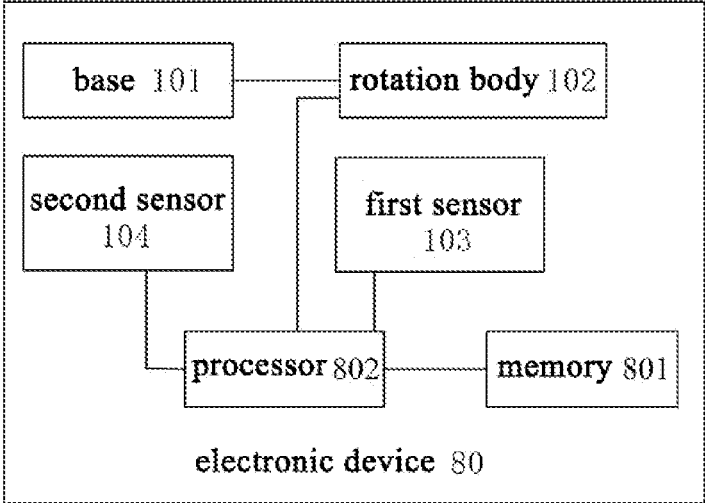
FIG. 8 is a fourth schematic diagram of the structure of an electronic device according to an embodiment of the present disclosure.

Or, as shown in FIG. 8, the electronic device comprises a memory 801, a processor 802, the base 101, the rotation body 102, the first sensor 103, and the second sensor 104.

The rotation body 102 is rotatably connected to the base 101, and a physical zero-initialization point is provided on the rotation body 102 or the base 101.

The first sensor 103 is used to detect the rotation angle of the rotation body 102 on the rotation plane.

The second sensor 104 is used to detect the physical zero-initialization point. The physical zero-initialization point is such a position that after the rotation angle of the rotation body 102 detected by the first sensor 103 is set to zero on the rotation plane, the rotation angle of the rotation body on the rotation plane is re-detected by the first sensor 103.

The memory 801 is used to store computer instructions.

The processor 802 is used to call the computer instruction from the memory, so as to execute the method described in any one of the method embodiment 1 and the method embodiment 2.

Storage Medium Embodiment

An embodiment of the present disclosure provides a computer-readable storage medium, on which a computer program is stored, and when the computer program is executed by a processor, the method described in any one of the method embodiment 1 and the method embodiment 2 is realized.

The present disclosure may be a system, a method, and/or a computer program product. The computer program product may include a computer-readable storage medium loaded with computer-readable program instructions thereon for executing various aspects of the present disclosure.

The computer-readable storage medium may be a tangible device capable of holding and storing instructions used by the instruction executing device. The computer-readable storage medium may be, but not limited to, for example, electrical storage devices, magnetic storage devices, optical storage devices, electromagnetic storage devices, semiconductor storage devices or any random appropriate combinations thereof. More specific but non-exhaustive examples of the computer-readable storage medium include: portable computer disk, hard disk, random-access memory (RAM), read-only memory (ROM), erasable programmable read-only memory (EPROM or flash), static random access memory (SRAM), portable compact disk read-only memory (CD-ROM), digital versatile disk (DVD), memory stick, floppy disk, mechanical coding device, such as a punched card storing instructions or an emboss within a groove, and any suitable combinations thereof. The computer-readable storage medium used herein is not interpreted as a transient signal itself such as radio wave or other freely propagated electromagnetic wave, electromagnetic wave propagated through waveguide or other transmission medium (such as optical pulses passing through fiber-optic cables), or electric signals transmitted through electric wires.

The computer-readable program instructions described herein may be downloaded from the computer-readable storage medium to various computing/processing devices, or to external computers or external storage devices via a network such as the Internet, local area network, wide area network and/or wireless network. The network may comprise copper transmission cables, optical fiber transmission, wireless transmission, routers, firewalls, switches, gateway computers and/or edge servers. The network adapter or network interface in each computing/processing device receives computer-readable program instructions from the network, and forwards the computer-readable program instructions for storage in the computer-readable storage medium of each computing/processing device.

The computer program instructions for executing the operations of the present disclosure may be assembly instructions, instructions of instruction set architecture (ISA), machine instructions, machine-related instructions, microcodes, firmware instructions, state setting data, or a source code or target code written by any combinations of one or more programming languages. the programming languages include object-oriented programming languages, such as Smalltalk, C++, and conventional procedural programming languages, such as "C" language or similar programming languages. The computer-readable program instructions may be completely or partially executed on the user computer, or executed as an independent software package, or executed partially on the user computer and partially on the remote computer, or completely executed on the remote computer or the server. In the case where a remote computer is involved, the remote computer may be connected to the user computer by any type of networks, including local area network (LAN) or wide area network (WAN), or connected to an external computer (such as via the Internet provided by the Internet service provider). In some embodiments, the electronic circuit is customized by using the state information of the computer-readable program instructions. The electronic circuit may be a programmable logic circuit, a field programmable gate array (FPGA) or a programmable logic array (PLA) for example. The electronic circuit may execute computer-readable program instructions to implement various aspects of the present disclosure.

Various aspects of the present disclosure are described herein with reference to the flow chart and/or block diagram of the method, device (system) and computer program product according to the embodiments of the present disclosure. It should be understood that each block in the flow chart and/or block diagram and any combinations of various blocks thereof may be implemented by the computer-readable program instructions.

The computer-readable program instructions may be provided to the processing unit of a general purpose computer, a dedicated computer or other programmable data processing devices to generate a machine, causing the instructions, when executed by the processing unit of the computer or other programmable data processing devices, to generate a device for implementing the functions/actions specified in one or more blocks of the flow chart and/or block diagram. The computer-readable program instructions may also be stored in the computer-readable storage medium. These instructions enable the computer, the programmable data processing device and/or other devices to operate in a particular way, such that the computer-readable medium storing instructions may comprise a manufactured article that includes instructions for implementing various aspects of the functions/actions specified in one or more blocks of the flow chart and/or block diagram.

The computer-readable program instructions may also be loaded into computers, other programmable data processing devices or other devices, so as to execute a series of operational steps on the computers, other programmable data processing devices or other devices to generate a computer implemented process. Therefore, the instructions executed on the computers, other programmable data processing devices or other devices may realize the functions/actions specified in one or more blocks of the flow chart and/or block diagram.

The accompanying flow chart and block diagram present possible architecture, functions and operations realized by the system, method and computer program product according to the embodiments of the present disclosure. At this point, each block in the flow chart or block diagram can represent a module, a program segment, or a portion of the instruction. The module, the program segment or the portion of the instruction includes one or more executable instructions for implementing specified logic functions. In some alternative implementations, the function indicated in the block can also occur in an order different from the one represented in the drawings. For example, two consecutive blocks actually can be executed in parallel, and sometimes they may also be executed in a reverse order depending on the involved functions. It should also be noted that each block in the block diagram and/or flow chart, and any combinations of the blocks thereof can be implemented by a dedicated hardware based system for implementing specified functions or actions, or a combination of the dedicated hardware and the computer instructions. It is well known to those skilled in the art that implementation by hardware, implementation by software, and implementation by a combination of software and hardware are all equivalent.

The embodiments of the present disclosure have been described above in an illustrative and non-exhaustive manner. The present disclosure is not limited to the embodiments disclosed herein. Various modifications and changes will be apparent to those skilled in the art without departing from the scope of the embodiments. The choice of terms used herein is intended to best explain the principles, practical applications, or technical improvements of the embodiments, or to enable other skilled persons in the art to understand the embodiments disclosed herein. The scope of the present disclosure is defined by the appended claims.

The following detailed description is merely exemplary in nature and is not intended to limit the invention or the application and uses of the invention. Furthermore, there is no intention to be bound by any theory presented in the preceding background of the invention or the following detailed description.

What is claimed is:

1. A method for controlling an electronic device, the electronic device comprising: a base, a rotation body, a first sensor, and a second sensor, wherein the rotation body is rotatably connected to the base, and a physical zero-initialization point is provided on the rotation body or the base;

the first sensor is used to detect a rotation angle of the rotation body on a rotation plane; and the second sensor is used to detect the physical zero-initialization point, and when the physical zero-initialization point is detected by the second sensor, after the rotation angle of the rotation body on the rotation plane detected by the first sensor is set to zero, the rotation angle of the rotation body on the rotation plane is re-detected by the first sensor, wherein a first surface of the rotation body includes at least two first regions connected end to end, and the two first regions are arranged along a rotating direction of the rotation body, and the physical zero-initialization point is located on a boundary line between two adjacent first regions;

the second sensor is provided on the base and used to emit wave signals toward the first surface of the rotation body;

wherein the wave signals emitted by the second sensor are irradiated on different first regions of the first surface of the rotation body, and reflected wave signals received by the second sensor are different, or a first surface of the base includes at least two second regions connected end to end, and the two second regions are arranged along a rotation direction of the rotation body, and the physical zero-initialization point is located on a boundary line between two adjacent second regions is;

the second sensor is provided on the rotation body and used to emit wave signals toward the first surface of the base;

wherein the wave signals emitted by the second sensor are irradiated on different second regions of the first surface of the base, and reflected wave signals received by the second sensor are different, the first sensor is a rotation angle detection sensor, and the second sensor is a wave sensor, the method for controlling an electronic device comprising the steps of:

acquiring a target rotation direction and a first target rotation angle;

acquiring a third target rotation angle, wherein the third target rotation angle is a rotation angle needed for rotating, for the first time, to a boundary of a prohibited rotation angle range along the target rotation direction;

judging whether the first target rotation angle is greater than the third target rotation angle;

when the first target rotation angle is less than or equal to the third target rotation angle, controlling the rotation body to rotate by the first target rotation angle along the target rotation direction;

when the first target rotation angle is greater than the third target rotation angle, updating the target rotation direction to a rotation direction opposite to the target rotation direction, and updating the first target rotation angle to a difference value between 360° and the first target rotation angle, and performing the step of controlling the rotation body to rotate by the first target rotation angle along the target rotation direction, when the rotation body rotates by the first target rotation angle along the target rotation direction, when the physical zero-initialization point was detected by the second sensor, determining a second target rotation angle according to a current rotation angle detected by the first sensor and the first target rotation angle;

setting the current rotation angle detected by the first sensor to zero, and controlling the first sensor to re-detect the rotation angle of the rotation body on the rotation plane; and updating the second target rotation angle to the first target rotation angle, and repeating the step of controlling the rotation body to rotate by the first target rotation angle along the target rotation direction.

* * * * *